United States Patent

Crossman et al.

[11] Patent Number: 5,213,348
[45] Date of Patent: May 25, 1993

[54] WORKPART CHUCK POSITIONING MECHANISM WITH INDEPENDENT SHOES

[75] Inventors: Richard E. Crossman, Leominster, Mass.; Victor Dzewaltowski; Walter Dodd, both of Springfield, Vt.

[73] Assignee: Bryant Grinder Corporation, Springfield, Vt.

[21] Appl. No.: 872,928

[22] Filed: Apr. 23, 1992

Related U.S. Application Data

[63] Continuation of Ser. No. 619,255, Nov. 28, 1990, Pat. No. 5,108,117.

[51] Int. Cl.⁵ .................. B23B 13/00; B24B 49/00
[52] U.S. Cl. .................. 279/126; 51/238 GG; 82/170; 279/133
[58] Field of Search .................. 33/550, 642, 644; 51/165.75, 238 GG, 239, 238.5; 82/151, 164, 170; 279/126, 133; 364/474.06, 474.34

[56] References Cited

U.S. PATENT DOCUMENTS

| | | | |
|---|---|---|---|
| 3,263,374 | 8/1966 | Stuckey et al. | 51/165.75 |
| 3,281,995 | 11/1966 | Parrella et al. | 51/165 R |
| 3,904,390 | 9/1975 | Bottomley | 51/239 X |
| 4,790,545 | 12/1988 | Dzewaltowski et al. | 279/126 |
| 4,926,337 | 5/1990 | Gile | 279/133 X |
| 4,951,422 | 8/1990 | Hiroyuki et al. | 51/165.71 |
| 5,108,117 | 4/1992 | Crossman et al. | 279/126 |

FOREIGN PATENT DOCUMENTS

| | | |
|---|---|---|
| 368648 | 5/1990 | European Pat. Off. |
| 377796 | 7/1990 | European Pat. Off. |
| 1171750 | 12/1987 | Japan |
| 1306164 | 6/1988 | Japan |

*Primary Examiner*—Steven C. Bishop
*Attorney, Agent, or Firm*—Hamilton, Brook, Smith & Reynolds

[57] ABSTRACT

A workpart chuck centering mechanism moves towards the axis of rotation of the chuck as the chuck rotates in an eccentric non-centered position. The centering mechanism includes two independent shoes. Each shoe is driven by a servo-motor and encoder. The two shoes function in a cooperative manner to center the workpart. A sensing device monitors any eccentric movement of the workpart and controls the positioning of the shoes. The two shoes and the sensing device are mounted on a base which can pivot about the chuck axis. The directions of movement of the respective shoes are displaced 90° relative to one another and intersect at the chuck axis.

20 Claims, 5 Drawing Sheets

WORKPART CHUCK POSITIONING MECHANISM WITH INDEPENDENT SHOES

This application is a continuation of application Ser. No. 07/619,255, filed Nov. 28, 1990, now U.S. Pat. No. 5,108,117.

BACKGROUND

Machine tools such as internal and external grinding machines are known to utilize workpart centering mechanisms for positioning a workpart relative to a workpart chuck that rotates the workpart for grinding operations. In production type of machining operations, magnetic faceplate chucking is less frequently used since time is lost and skilled operator attention is required for centering each workpiece on the faceplate. A dial indicator and skillfully dealt hammer blows to the workpiece are required to center the workpiece. Of course, the object for the operator is to center the workpiece on the faceplate with the geometrical axis of the workpiece substantially coaxial with the rotational axis of the faceplate that is attached on a rotatable spindle.

Automatic centering control mechanisms using a single drive shoe to center the workpart have been developed. However, such systems cannot be employed in traditional centerless tooling procedures in which the workpart axis is intentionally offset from the spindle axis for the grinding operation. A need exists for a workpart chuck centering mechanism that can be adapted for centerless tooling procedures yet provides a system employing computer numerically controlled capabilities for automated centering.

SUMMARY OF THE INVENTION

The invention relates a workpart positioning mechanism with a first shoe element for moving the workpart in a first direction and a second shoe element that can move the workpart in a second direction. Each shoe element is fitted with a shoe that can be used to control the position of a workpart either during a centering procedure or during a centerless grinding operation. The system can be adapted for either internal or external grinding operations.

The degree of workpart eccentricity or offset from the desired location is monitored by a sensing device and processed by an automatic control system which controls shoe element movement as well as other grinding machine components. When used for centering a workpart for grinding, one shoe (the "positioning shoe") is used to move the workpart towards the center. The second shoe (the "following shoe") is maintained a few thousandths of an inch from the workpart during centering. If the workpart is moved just beyond the center, the workpart will snap into a position in contact with both shoes which are then retracted to restart the centering procedure. By using two centering shoe elements, the workpart can be repositioned quickly and efficiently. Each shoe can be used as either the positioning shoe or the following shoe depending upon the direction of rotation of the spindle. Moreover, the two separate shoe elements can be used as stop devices to prevent the workpart from moving during the grinding operation.

In a preferred embodiment, the first shoe element is moved in a direction that is perpendicular to the direction of movement of the second shoe element. The first shoe element direction and the second shoe element direction define axes that can be positioned to intersect at the center of the chuck. For applications thus, the workpart axis can be precisely positioned at the chuck axis. The workpart is positioned on the chuck by means of either a magnetic or mechanical coupler. The first and second shoe elements and the position detector are positioned on a support which pivots about the center of the chuck.

The speed and precision of the two shoe centering mechanism facilitates the rapid changeover of tooling workparts for production machines without operator assistance. Note further, for an alternative use of the two independent shoe system, in which the shoe elements are secured to hold the workpart for a standard centerless grinding operation. In this embodiment the shoes position the workpart axis at a desired offset from the spindle axis. The force imparted to the workpart by the rotating chuck and magnetic faceplate is directed between the first and second shoe elements. Thus, both shoes are used to maintain the workpart axis at the desired offset during the grinding operation.

BRIEF DESCRIPTION OF THE DRAWINGS

The foregoing and other objects, features and advantages of the invention will be apparent from the following detailed description of the preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
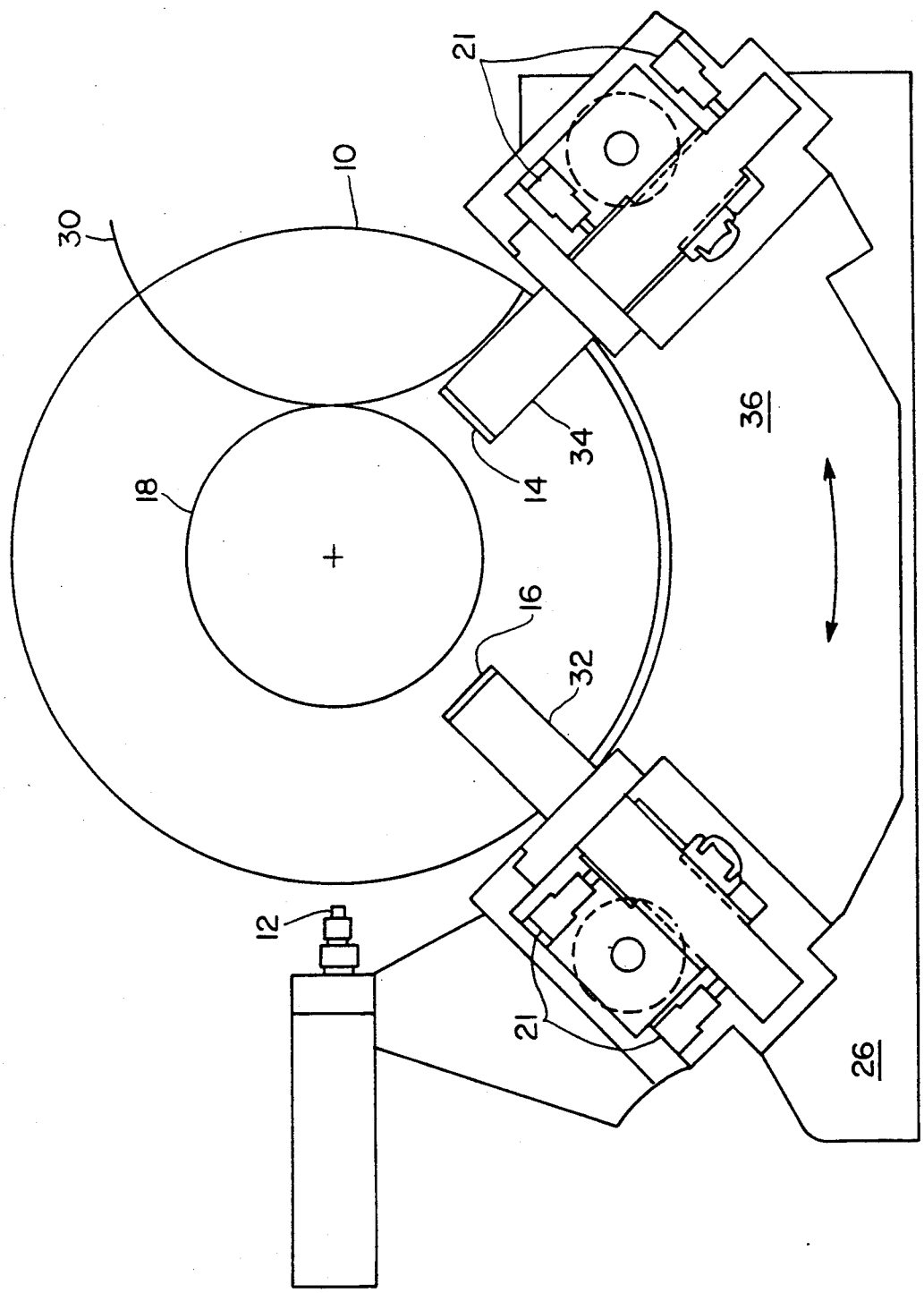
FIG. 1 illustrates a front view of the preferred embodiment of the invention.
Figure 2:
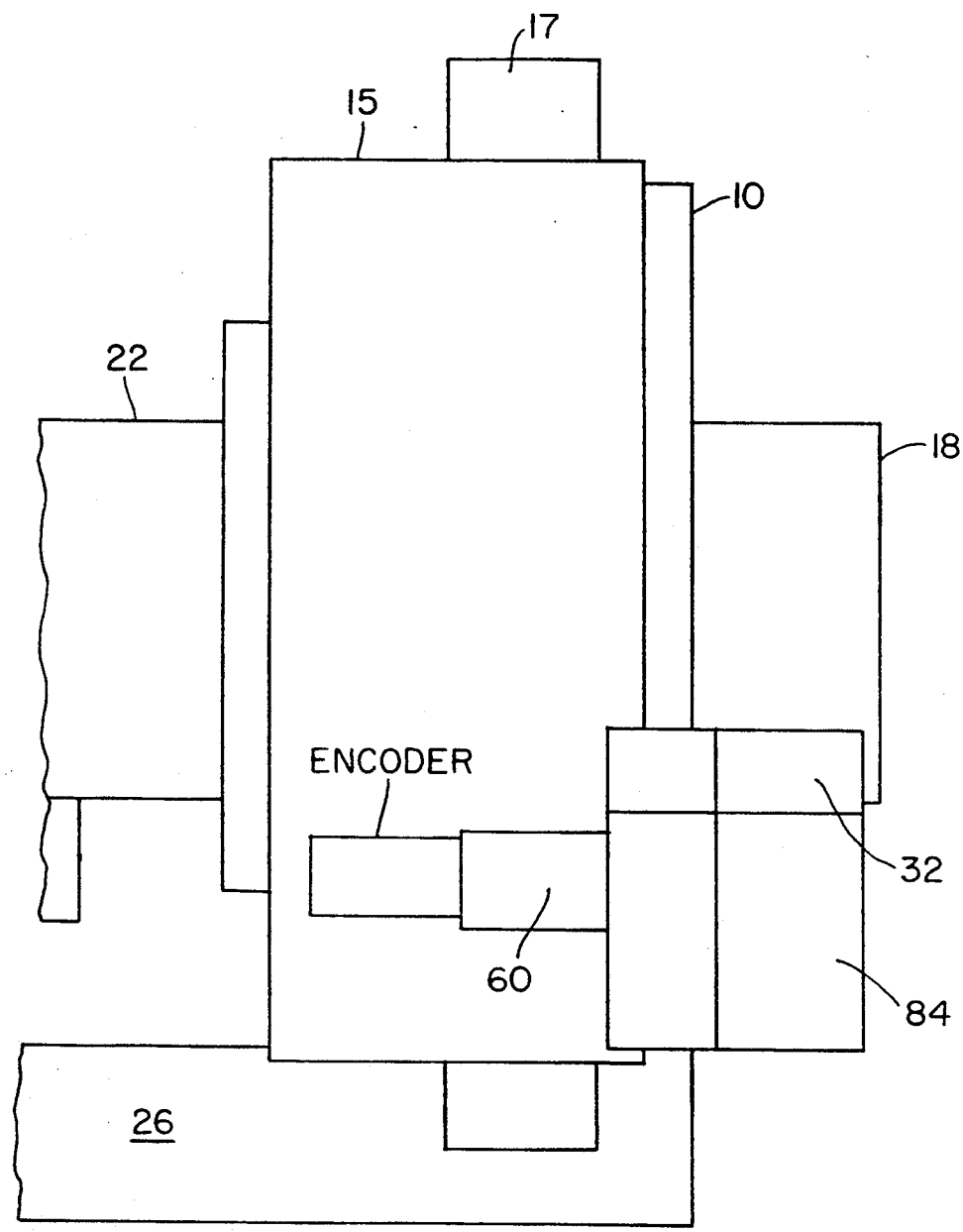
FIG. 2 illustrates a horizontal view of the preferred embodiment of the invention.

FIGS. 1 and 2 illustrate a magnetic workpart chuck 10 for a grinding machine that can be adopted for internal or external grinding. Note however, that the invention is not limited to grinding machines or to magnetic chucks but can be adopted for use in other machining operations.

As is known in applications requiring the centering of a workpart for grinding, an annular workpart W is held on magnetic chuck faceplate 10 with the rotational axis of the workpart and faceplate 10 substantially coaxial or aligned. The chuck faceplate is attached on a rotatable spindle and the spindle is rotated by an electric motor or other conventional and known means. The spindle and motor can include separate components drivingly connected for example by a drive belt, or pulleys, gear train, etc., or the spindle and motor can be integrated to provide a motorized spindle. For example, U.S. Pat. No. 4,790,545, incorporated by reference herein, illustrates centering mechanisms employed in a grinding machine.

Suitable faceplates for use in the invention are available commercially. Known mechanical workpart clamps or chucks can be used in the invention in lieu of the magnetic faceplace; e.g., roll clamping and air clamping where the workpart is held by rollers or air pressure against a faceplate on a spindle can be used in lieu of the magnetic faceplate 10 to be described below.

Spindle within housing 22 and electric motor 24 are typically mounted on the base 26 of the grinding machine or a slide (not shown) movable on the base.

Figure 4:
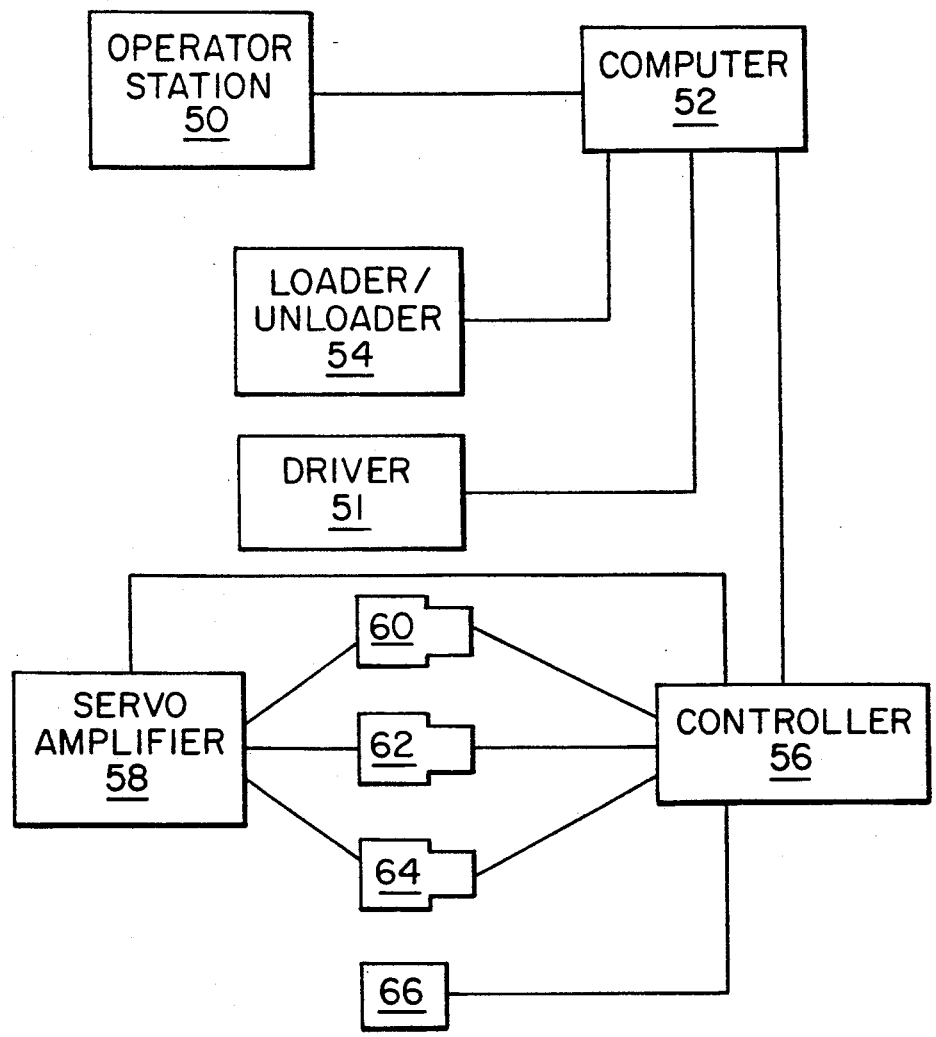
FIG. 4 illustrates schematically the control system employed for positioning of workparts.

As described in FIG. 4 of U.S. Pat. No. 4,790,545, grinding wheel 30 is moved into the workpart bore for internal grinding and rotated and reciprocated against the inner annular surface S to grind same. The grinding wheel is radially fed into the annular surface at a desired feed rate until the final ground dimension is achieved. The mechanism for moving the grinding wheel is well known in the art e.g., U.S. Pat. No. 4,653,235 issued Mar. 31, 1987, and forms no part of the present invention.

As is known, during grinding, the workpart W is centered on chuck faceplate 10 with its rotational (geometrical) axis substantial coaxial with the rotational axis R of the faceplate and spindle.

Typically, successive workparts are ground one after another until the desired number have been ground. A workpart loader/unloader is provided to place an unground workpart faceplate 10 after the previously ground workpart is removed therefrom. Loader/unloader 54 is illustrated schematically (see FIG. 4) and includes a pivotal arm having workpart grippers. The pivotal arm is pivoted from a source of unground workparts to carry an unground workpart to a position in front of the faceplate 10. When the pivotal arm is in front of the faceplate, the pivotal arm is axially slidable in a direction toward the faceplate 10 to deliver a workpart W to the faceplate 10 and is slidable axially away from the faceplate and then pivoted to allow grinding.

After grinding of the workpart, the pivotal arm is pivoted and then moved axially toward the faceplate to grip the ground workpart and axially away to remove the ground workpart from the faceplate 10. The arm is then pivoted to discharge the ground workpart and to pick up an unground workpart for placement on faceplate 20. The sequence of movements of the pivotal and axially movable arm is repeated for each workpart. Such workpart loaders/unloaders are known in the art; e.g., available on Bryant 2209D-II internal grinder available from Bryant Grinder Corporation, Springfield, Vermont. Workpart loaders/unloaders of other known types can be used in the invention.

Regardless of the workpart loader employed, the loader does not place the workpart geometrical axis and chuck axis substantially coaxial. Instead, the workpart typically is placed on the faceplate with a characteristic offset of the workpart axis G from the chuck axis R (FIG. 3A) such that rotation of the chuck causes the workpart axis to travel in an eccentric path.

The same off-center positioning of the workpart will be experienced in the event the workpart is loaded onto the faceplate 10 manually by the machine operator.

FIGS. 1 and 2 illustrate the two shoe element centering mechanisms of the invention. Sensor or detector 12 provides a continuous measure of the amount of offset of the geometrical center of the workpart 18 from the chuck axis. An offset or eccentricity signal from sensor 12 is delivered to an automatic control device which creates an output drive signal for each shoe element in accordance with this offset as well as a measure of the angular position of the chuck (as determined by a tachometer referenced to a given position of the chuck workface).

Figure 3A:
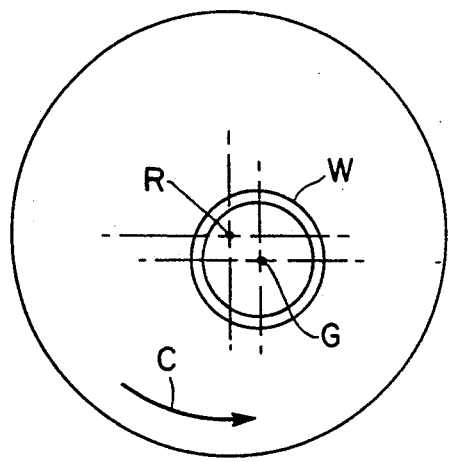
FIGS. 3A-3C illustrate the centering process.

By using a first shoe 14 and a second shoe 16 moving in different directions, the workpart can be repositioned to align its geometric center with the chuck axis in a rapid and efficient fashion. The two independent shoes each are driven by a servo-motor and an encoder, or other prime mover, through an anti-backlash worm gear reduction. For example, motor drives the worm gear of the first shoe 14 and motor drives the worm gear of the second shoe. The internal diameter of a worm gear drives a threaded plunger 34 or element on which shoe 14 is mounted. The plunger rides on bushings and is secured by hydraulic elements 21. The two shoes track each other and function, as described in connection with FIGS. 3A–3C below, to center the workpart. The shoes act in respective directions which are perpendicular to one another and preferably intersect at the chuck axis. Servo motors 60 and 62 (see description of FIG. 4 below) supply the automatic controller with data concerning the position the respective shoe drive shafts 32 and 34.

The sensor 12 and first and second shoes are mounted on a shoe support 36 or holder that is rotatably mounted to pivot around the chuck axis relative to the base 26. The support 36 is rigidly bearing mounted to the workhead base 26 and through a worm gear arrangement and can be rotated about the chuck axis to a programmed position that facilitates either outer diameter on inner diameter grinding. The support 36 is physically locked in position during grinding. When the support 36 is pivoted, it is hydraulically released. A separate servo motor and encoder drive the movement of the holder 36 relative to base 26.

The automatic control device processes input information concerning eccentricity, angular position of the chuck, linear position of shoe shafts, and angular position of the shoe base to derive a drive signal for each shoe shaft. A preferred embodiment of the control system is shown schematically in FIG. 4. As a result, the workpart can be precisely centered on the chuck axis. As a result, the shoes need not contact the workpart during grinding to contain the workpart. Thus, eccentric offsets of the workpart and the resultant wear on shoeties and workparts can be eliminated. If the workpart overruns the center of the chuck, the shoes will retract and begin the centering process again. When centering is finally achieved, the shoes are retracted to clear the workpart.

The operator can program the main computer numerical control (CNC) system 52 to conduct various types of grinding operations. More specifically, the computer or programmable data processing system 52 controls the operation of the loader/unloader 54, the main spindle operation including driver 51 and dresser (not shown), and controller 56. The controller 56 receives position feedback information from three servomotors 60, 62, 64, each of which is fitted with a rotary encoder. Servomotor 60 serves to control the movement of the first shoe element 14, 34, servomotor 62 serves to control the movement of the second shoe element 16, 32, and servomotor 64 serves to control the movement of the shoe holder or support 36.

The servoamplifier 58 receives velocity feedback information from each of the servomotors 60, 62 and 64 and serves with controller 56 to provide the necessary voltage to the servomotors to accurately control the movement of the shoe elements and the holder 36.

The detector 12 includes linear encoder 66 to provide position feedback information regarding the position of the workpart to the controller 56.

The detector 12 can be a long stroke device that provides adequate resolution and is mounted on the shoe holder 36. Alternatively the detector 12 can be a short stroke device, such as an LVDT, that is mounted on either side of the following shoe element.

The control device can employ automated processing techniques. For example, Gile in U.S. Pat. No. 4,926,337 that is incorporated herein by reference, describes a computer microprocessor which utilizes a look-up table to process chuck angular position and eccentricity information to drive a hammer to reposition a workpart. A similar microprocessor can be used to drive the two shoes of the preferred embodiment.

Shoe inserts 14, 16 take the form of plates permanently or, optionally, releasably attached on the holders 34, 32. The shoe inserts define a pocket adapted to receive the off-center workpart on faceplate 10 as will be explained.

Figure 3B:
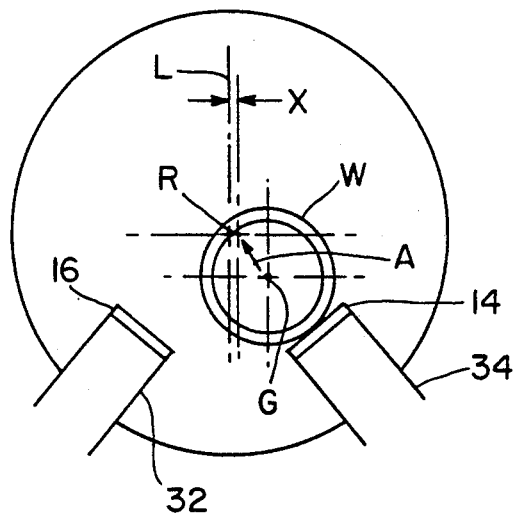
Figure 3C:
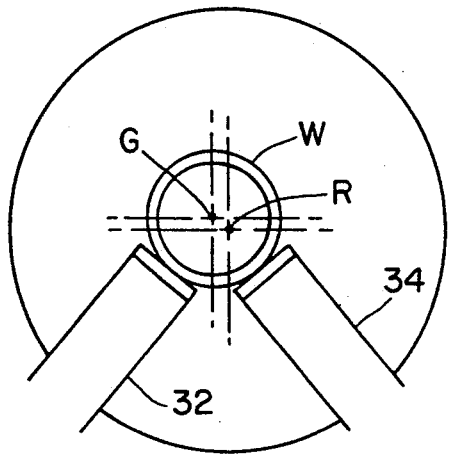

Shoe inserts 14, 16 preferably are positioned relative to the rotational axis of the faceplate and spindle to have only shoe insert 14 initially engage the workpart and to move the workpart of FIG. 3B toward the rotational axis R of the faceplate (see arrow A of FIG. 3B).

Such engagement of shoe insert 14 with the workpart is shown in FIG. 3B. It is apparent that the workpart initially engages only shoe insert 14 and not shoe insert 16. This is accomplished by locating the shoe inserts so as to make the imaginary line L which bisects the included angle formed by the contact surfaces 14, 16 of the inserts (hereafter referred to as bisector) offset a distance X laterally of the rotational axis R. The bisector is offset in a direction opposite to the direction of rotation (arrow C in FIG. 3A), of the faceplate for reasons to be explained. The statement that the bisector is offset in a direction opposite of the direction of rotation is intended to mean that a point on the rotating chuck faceplate approaching the centering member 34 will cross the bisector (line L) before it crosses a line that extends through the center of the rotating chuck faceplate and that is parallel to the bisector. Distance X typically is about 10 mils (0.010 inch).

In typical operation of the magnetic workpart chuck, machine control 52 sets the magnetic intensity of faceplate to a first predetermined level and commands the loader/unloader 54 to place a workpart on the faceplate as shown in FIG. 3A. Once the workpart is loaded, the magnetic intensity is changed to a second predetermined level higher than the first level.

The faceplate can be rotated during loading or is rotated immediately following loading of the workpart thereon. Since the workpart is loaded offcenter on the faceplate, the control 56 directs the advance of shoe inserts 14, 16 on holder 36 from an initial starting position toward the chuck rotational axis R. The holder 36 and shoe inserts thereon is advanced at a first predetermined speed as the faceplate rotates the off-center workpart with its workpart axis traveling along an eccentric path. The eccentric path of movement of the workpart changes as it is moved toward the chuck axis. As the shoe inserts 14, 16 are advanced by servomotors 60, 62 detector 12 contacts the eccentrically rotating workpart However, as shoe insert 14 continues to move the workpart closer to the rotational axis R of the faceplate in the direction of small arrow A in FIG. 3B contact between detector 12 and the offcenter workpart eventually becomes continuous and the amplitude of the cyclically varying signal (approximate sine wave) from the detector 12 becomes proportional to the extent or magnitude of eccentric movement of the workpart.

When the amplitude reaches a first predetermined level or value, the speed of advance of the workpart engaged by shoe inserts 14, 16 is reduced optionally to a second lower level or value When the amplitude of the signal from detector 12 reaches a second predetermined value lower than the first value and indicative of the workpart rotating about its own axis; i.e., with its axis substantially coaxial with rotational axis R, the control directs the servomotors 60, 62 to stop and optionally to reverse direction to retract shoe inserts 14, 16 away from the now centered workpart a selected small amount This optional retraction will prevent needless rubbing/wear between the shoe inserts and workpart and yet will position the shoe inserts sufficiently close to the workpiece to prevent excessive movement of the centered workpart in the event of accidental application of grinding forces exceeding the magnetic and friction holding force between the faceplate and the workpart.

Moving the workpart toward rotational axis R with the bisector of shoe inserts 14, 16 offset (distance X) has been found to be important in case the workpart is advanced slightly too far past the chuck axis R. The inventors found that with the offset present, the workpart will snap from the position of FIG. 3B to the position of FIG. 3C in full contact with shoes 14 and 16.

Figure 5:
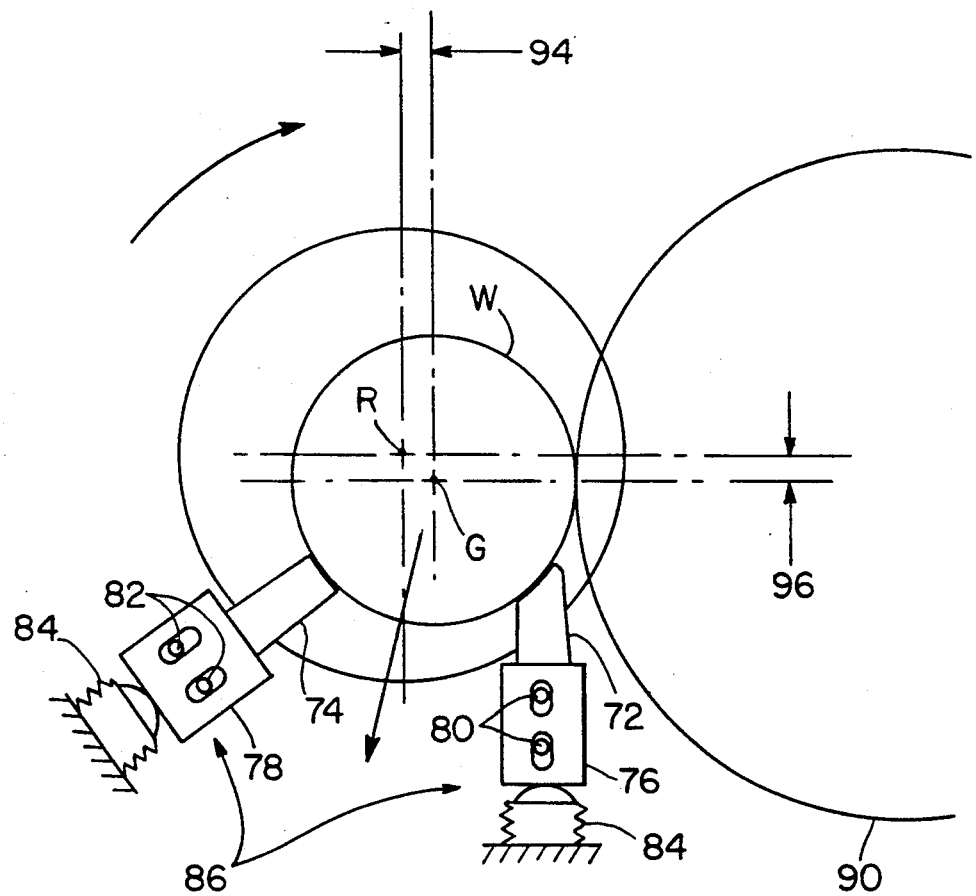
FIG. 5 illustrates an alternative embodiment employing the two shoes for centerless grinding.

In a centerless grinding operation commonly used in grinding cylindrical parts for bearing applications, work support shoes 72, 74 are adjustably mounted on shoe holder 86 as shown in FIG. 5. Shoe holder 86 is, in turn, mounted on the workhead base, the holder 86 position being controlled by servomotor as previously described and illustrated in FIG. 1.

The second shoe 74 is adjustable angularly and is normally set 13 to 15 degrees below the horizontal. The first shoe 72 is adjustable horizontally and is set as far toward the wheelslide as possible without making contact with the grinding wheel when 90 it is in finish grind position.

Both shoes are adjustable in respect to their distances from the center R of the driver in order to provide for different workpiece sizes and for regrinding. Methods of obtaining shoe locations differ but the ultimate settings are much the same in each case. The center G of workpiece W is offset from the center R by dimensions 94 and 96. This offset can be adjusted by the operator at 50 if desired. These settings are such that a finished workpiece, when resting on shoes 72, 74 is preferably 0.010" below center R of driver at 94 and 0.010" toward grinding wheel from center R of driver as indicated at 96. Greater off-set is required if grind stock exceeds 0.020" on diameter.

The usual procedure is to set up the shoes to predetermined positions on a tool room grinding fixture, then grind the shoes to fit a prescribed part. The shoes are then transferred to the grinder. Any further adjustment in shoe location is made by altering the settings of the adjusting screws 84 and repositioning the shoe holder 86.

Once shoes 72 and 74 have been satisfactorily positioned by this method it should not be necessary to reposition adjusting screws 84 when shoes 72, and 74 are later reground to the same prescription. The shoes 72 and 74 are mounted in elements 76 and 78 with hold down screws 80 and 82.

The system can also be adapted for centerless internal grinding operations.

While the invention has been particularly shown and described with reference to a preferred embodiment thereof, it will be understood by those skilled in the art that various changes in form and details may be made therein without departing from the spirit and scope of the invention as defined by the appended claims.

We claim:

1. A method for centering a workpart on a rotating chuck comprising the steps of:
   moveably coupling the workpart to the chuck such that the workpart is moveable relative to the chuck;
   rotating the chuck about a chuck axis such that a geometrical axis of the workpart is offset from the chuck axis;
   measuring the degree of workpart geometrical axis offset for the chuck axis of rotation;
   positioning a first shoe element in contact with the workpart with a first driver and positioning a second shoe element in proximity to the workpart with a second driver; and
   moving the first shoe element with the first driver and the second shoe element with the second driver to move the workpart axis toward the chuck axis as the chuck and workpart rotate.

2. The method of claim 1 wherein the first element moves in a direction perpendicular to a direction of movement of the second element.

3. The method of claim 2 wherein the first direction and the second direction intersect at the center of the chuck.

4. The method of claim 1 wherein the first and second drivers comprise first and second servomotors.

5. The method of claim 1 wherein the workpart is positioned on the chuck with a magnetic holder.

6. The method of claim 1 wherein the workpart is positioned on the chuck with a mechanical holder.

7. A workpart chuck apparatus for centering a workpart on a rotating chuck comprising:
   a rotatable chuck having an axis of rotation;
   a coupler for moveably holding the workpart to the chuck such that the workpart is moveable relative to the chuck;
   a detector to measure an offset of a workpart geometrical axis from the chuck axis of rotation;
   a first shoe element positionable to guide movement of a workpart axis in a first direction;
   a second shoe element positionable to guide movement of the workpart axis in a second direction; and
   a control system electrically connected to the first driver and the second driver to independently control positioning of the first shoe element and the second shoe element relative to the workpart.

8. The workpart chuck apparatus of claim 7 wherein the first direction is positioned perpendicular to the second direction.

9. The workpart chuck apparatus of claim 7 wherein the first direction and the second direction intersect at the center of the chuck.

10. The workpart chuck apparatus of claim 7 wherein the detector generates an electrical signal correlated with the measured offset that is delivered to the control system.

11. The workpart chuck apparatus of claim 7 further comprising a support assembly on which the first element and second element are mounted.

12. The workpart chuck apparatus of claim 11 wherein the support assembly is rotatably mounted such that the support assembly can rotate about the chuck axis of rotation.

13. The workpart chuck apparatus of claim 7 wherein said coupler further comprises a magnetic holder.

14. The workpart chuck apparatus of claim 7 wherein the coupler further comprises a mechanical holder.

15. The workpart chuck apparatus of claim 7 wherein the control system further comprises a first servomotor to control the position of the first element and second servomotor to control position of the second element.

16. The workpart chuck apparatus of claim 7 wherein the detector comprises a linear encoder.

17. The workpart chuck apparatus of claim 11 further comprising a servomotor to control the position of the support assembly.

18. The workpart chuck apparatus of claim 7 wherein the first and second elements each comprise a worm gear to control linear movement of each element relative to the chuck axis.

19. A workpart chuck apparatus for centering a workpart on a rotating chuck of a grinding machine comprising:
   a rotatable chuck having an axis of rotation;
   a coupler for moveably holding the workpart on the chuck such that the workpart is moveable relative to the chuck;
   a detector t measure an offset of a workpart geometrical axis form the chuck axis of rotation and generate a feedback signal;
   a first shoe element positionable to guide movement of the workpart axis in a first direction relative to the chuck axis of rotation, the first shoe element being mechanically driven by a first servomotor;
   a second shoe element positionable to guide movement of the workpart axis in a second direction relative to the chuck axis of rotation, the second shoe element being driven by a second servomotor; and
   a control system electrically connected to the first servomotor and the second servomotor to independently control positioning of the first shoe element and the second shoe element relative to the workpart.

20. A method for holding a workpart on a rotating chuck in a centerless grinding operation comprising the steps of:
   moveably coupling the workpart to the chuck such that the workpart is moveable relative to the chuck;
   rotating the chuck about a chuck axis such that a geometrical axis of the workpart is offset from the chuck axis;
   positioning a first shoe element in contact with the workpart with a first positioning servomotor;
   positioning a second shoe element in contact with the workpart with a second positioning servomotor;
   holding the first shoe element and the second shoe element in a fixed position such that the workpart is maintained in an offset position relative to the chuck axis during a grinding operation.

* * * * *